Nov. 1, 1966     W. W. CUSHMAN     3,282,708
PROCESS FOR MOISTURIZING STALE BAKED DOUGH PRODUCTS
AND PACKAGE UTILIZED THEREFOR
Filed March 9, 1964
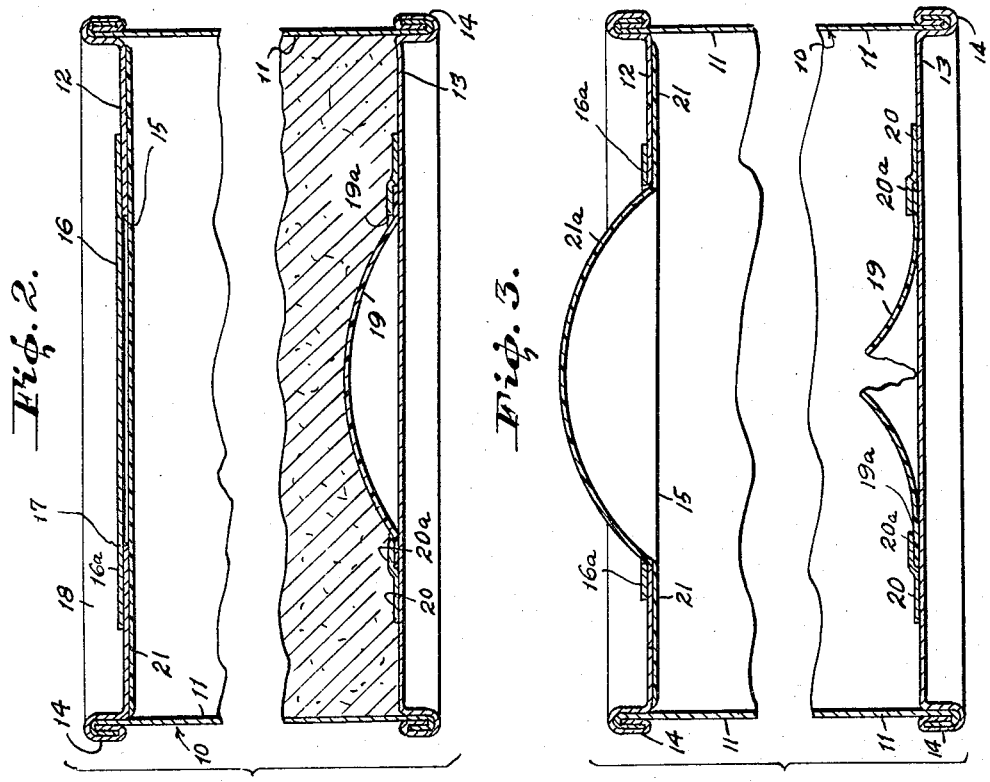
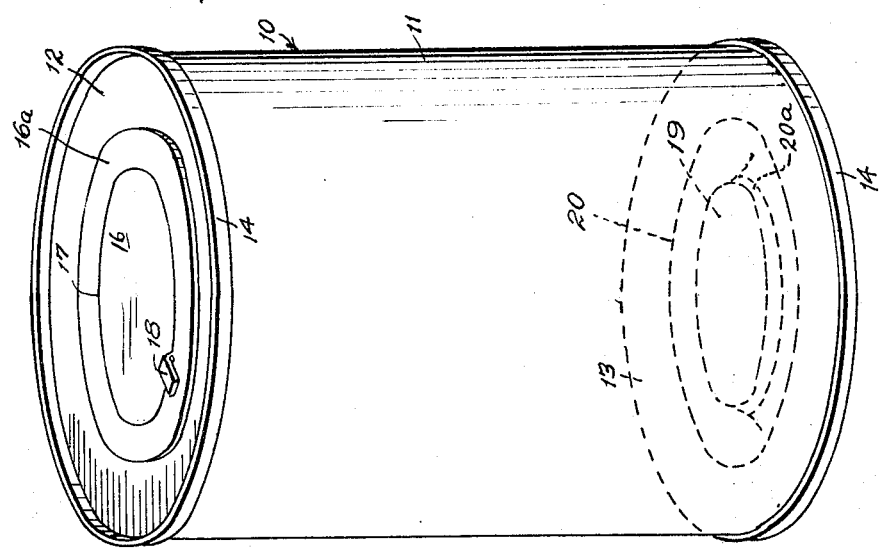
INVENTOR
Walton W. Cushman
BY Harry M. Saragovitz,
Edward J. Kelly &
Herbert Berl
ATTORNEYS.

United States Patent Office 3,282,708
Patented Nov. 1, 1966

3,282,708
PROCESS FOR MOISTURIZING STALE BAKED DOUGH PRODUCTS AND PACKAGE UTILIZED THEREFOR
Walton W. Cushman, 36483 Gloucester Drive, Moravian Meadows, Fraser, Mich.
Filed Mar. 9, 1964, Ser. No. 350,615
5 Claims. (Cl. 99—172)

The invention described herein, if patented, may be manufactured and used by or for the Government for governmental purposes, without the payment to me of any royalty thereon.

The present invention relates to a method of reconstituting canned bread and apparatus therefor. It has to do particularly, although not exclusively, with means and a method for improving the quality of canned bread by removing staling from and restoring freshness to said bread.

One of the objects of the invention is to provide an improved container, or can for bread and a new and novel method of reconstituting the bread while in the container, by a special and simple treatment to remove staling from and restore freshness to said bread.

Another object of the invention is to provide a new and improved can or container for the bread in which the means for removing staling and restoring freshness to the bread therein is stored in the can or container with the bread.

A further object of the invention is to provide canned bread in which the can is normally in tightly sealed condition to preserve the quality of the bread but which may be quickly and easily unsealed.

The foregoing and other objects and advantages of the invention will appear from the following description and appended claims when considered in conjunction with the accompanying drawing forming a part of this specification wherein like reference characters designate corresponding parts in the several views, wherein FIGURE 1 is a perspective view of a can or container of bread in closed and sealed condition, embodying the invention;

FIGURE 2 is an enlarged vertical sectional view, partly broken away, of the sealed can of FIGURE 1, showing details of the structure; and FIGURE 3 is a view similar to FIGURE 2, but showing the can and the bread contents after, or during, the operation of removing staling from and the restoring of freshness to the bread.

Before explaining in detail the present invention, it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation and is not intended to limit the invention claimed herein beyond the requirements of the prior art.

With reference now to the drawing wherein one form of can or container embodying the invention is shown, 10 represents, as a whole, a metal can having the usual cylindrical side wall or body 11, top wall or lid 12 and a bottom wall 13. The top and bottom ends, or walls 12 and 13 are, as shown, secured to the cylindrical body 11 by conventional seams 14.

The bottom wall 13 is imperforate, whereas the top wall or end 12 is provided with a central hole or opening 15 normally closed and sealed by a disk-like closure plate or cap 16, 16a. The cap 16 is held in place to overlie and to seal opening 15 in any suitable manner and by any suitable means, as by welding or soldering, applied to the marginal flange-like flat annular portion 16a of the cover which overlies and contacts the can lid 12, see FIGURE 2.

To facilitate removal of the cap portion 16 from lid 12 so as to expose the opening 15, the cap may be provided with a circular score line 17 located between the coplanar inner and outer portions 16 and 16a of the whole cap. At a point along said score line 17 the inner cap portion 16 has an upstanding integral tab or tongue 18. A suitable can key or tool (not shown) may be applied to this tongue and turned in a well known manner to separate and roll the central cap portion 16 along the score line 17 to separate and remove the same, leaving the surrounding ring-like band portion 16a remaining, as best seen in FIGURE 3.

For the purpose of removing staling from and restoring freshness to the bread, or other edible material within the can 10, there is provided a relatively small metallic disk-like member or container 19 formed, for example, from aluminum foil, there being two like size members of the foil sealed together around their peripheral edge portions 19a to provide a space therebetween for receiving and containing a small quantity of distilled water. The capsule or member 19, 19a is preferably placed upon the inner surface of the can bottom 13, see FIGURE 2.

If desired and in order to insure maintaining the preferred central location or position of capsule or member 19, 19a on the can bottom or base 13, holding means 20 in the form of an annulus (see FIGURE 1) having an inturned flange 20a which overlies the periphery 19a of member 19, may be provided. The holding or locating member 20 is attached to the can bottom 13 by welding or soldering. Spaced clips (not shown) may, of course, be substituted for the continuous holding and locating means 20, 20a.

Before closing the can 10 and after placing the capsule 19, 19a of distilled water on bottom 13, the baked bread is placed therein, after which a disk or membrane 21 of some suitable impervious and distortable material, such as Mylar (a polyethylene terephthalate resin) (see Zimmerman and Lavine, Handbook of Material Trade Names, Supp. I, 1956) film, is placed over the top of the bread. Thereafter, the can is closed by applying the top wall or lid 12 and the removable cap or cover 16, 16a to the body portion 11. The canned item, such as baked bread, in its can-like sealed container 10, is now ready for storage or distribution.

The canned bread described above in its special container or package will keep indefinitely. When, however, one of the cans 10 of bread is to be used, it is desirable to remove staling from it and to restore its freshness before it is consumed. At this stage the process or method of the present invention is employed. A can key or tool (not shown) is applied to the tab or tongue 18 and rotated to remove the inner portion 16 of the can cover, leaving the outer ring portion 16a thereof intact. This removal exposes the can top opening or hole 15 and reveals the flexible seal or disk 21. Thereafter, the process of reconstituting the bread in the can is carried forward to completion by first applying a flame to bottom 13 thereof to heat the distilled water in the frangible capsule 19 to the boiling point to cause the top wall of capsule or member 19 to burst and release steam which permeates the bread upwardly and which causes the flexible diaphragm 21 to bulge to the approximate shape and position shown at 21a in FIGURE 3. Continue to apply the flame for approximately five (5) minutes.

At this stage, the bulged portion 21a is pierced by a knife or other sharp instrument to release the surplus steam and confined atmosphere while the application of heat is continued for approximately another five (5) minutes. This should complete the reconstitution of the bread, whereupon the can lid 12 can be cut out and the bread removed. Products other than bread may well be canned as above and reconstituted by the process or method described above and as defined in the appended claims.

I claim:

1. In an apparatus for moisturizing stale, steam permeable, dough product, comprising a container housing the said dough product and having top and bottom walls, a frangible, heatable, water-containing capsule within said container in contact with the inner surface of said bottom wall and disposed between said bottom wall and said dough product, and an impermeable membrane of flexible material underlying said top wall above said dough product providing a further seal for the contents of the container, said top wall having an opening therein, and removable means, having a tear strip, closing said opening, whereby when said opening is uncovered and a sufficient quantity of heat is applied to the bottom of said container, the water in the capsule boils, fractures said capsule and emits steam which ascends through said dough product, pushes the membrane through the opening and, upon puncture of the membrane, exhausts through said opening.

2. The apparatus set forth in claim 1, wherein said frangible, water-containing capsule consists of aluminum foil and is of a size to provide the predetermined amount of steam.

3. The apparatus set forth in claim 1, wherein said impermeable membrane consists of polyethylene terephthalate resin.

4. The apparatus set forth in claim 1, wherein said baked dough product consists of bread.

5. The process of moisturizing stale baked dough products while in a container having a bottom wall and a top wall, said container having a removably covered opening in said top wall, a frangible, heatable, capsule of water in contact with the inner surface of said bottom wall and disposed between said bottom wall and said dough product, and an impermeable membrane disposed between said top wall and said dough product, said process comprising the steps of removing said cover from said opening, applying heat to said bottom wall for a period of time sufficient to cause the water in said capsule to boil, to fracture said capsule and to release a quantity of steam sufficient to permeate said dough product and to push said impermeable membrane through said opening, puncturing said impermeable membrane and maintaining said heat application a period of time sufficient to turn all of the water in said capsule to steam and to permit said steam to permeate said dough product and exhaust through said opening.

References Cited by the Examiner

UNITED STATES PATENTS

| | | | |
|---|---|---|---|
| 2,777,769 | 1/1957 | Hodges | 99—172 |
| 2,858,220 | 10/1958 | Battiste | 99—90 |
| 3,015,568 | 1/1962 | McLain | 99—172 |
| 3,027,262 | 3/1962 | Polin | 99—172 |

A. LOUIS MONACELL, *Primary Examiner.*

RAYMOND N. JONES, *Examiner.*